(12) United States Patent
Ullmann et al.

(10) Patent No.: US 12,011,753 B2
(45) Date of Patent: Jun. 18, 2024

(54) FORMING TOOL AND FORMING METHOD FOR PRODUCING AN OVERPRESSURE PREDETERMINED BREAKING POINT IN A BATTERY COVER

(71) Applicant: SCHULER PRESSEN GMBH, Goeppingen (DE)

(72) Inventors: Bernd Ullmann, Pfinztal (DE); Rainer Berkefeld, Bad Honnef (DE); Matthias Braun, Heiningen (DE); Torsten Becker, Suessen (DE)

(73) Assignee: SCHULER PRESSEN GMBH, Goeppingen (DE)

( * ) Notice: Subject to any disclaimer, the term of this patent is extended or adjusted under 35 U.S.C. 154(b) by 393 days.

(21) Appl. No.: 17/398,290

(22) Filed: Aug. 10, 2021

(65) Prior Publication Data

US 2022/0023928 A1 Jan. 27, 2022

Related U.S. Application Data

(63) Continuation-in-part of application No. PCT/EP2020/052899, filed on Feb. 5, 2020.

(30) Foreign Application Priority Data

Feb. 13, 2019 (DE) ...................... 10 2019 103 606.2

(51) Int. Cl.
*B21D 22/02* (2006.01)
*H01M 50/147* (2021.01)
(Continued)

(52) U.S. Cl.
CPC .......... *B21D 22/02* (2013.01); *H01M 50/147* (2021.01); *H01M 50/148* (2021.01); *H01M 50/3425* (2021.01); *H01M 2200/20* (2013.01)

(58) Field of Classification Search
CPC ........ B21D 22/02; B21D 22/06; B21D 22/22; B21D 22/26; B21D 28/22; B21D 22/04
(Continued)

(56) References Cited

U.S. PATENT DOCUMENTS 4,003,505 A * 1/1977 Hardt ...................... B65D 83/70
222/397
5,644,943 A * 7/1997 Lanz ...................... B21D 22/26
72/348

(Continued)

FOREIGN PATENT DOCUMENTS

DE 22 30 333 C3 2/1982
DE 89 08 578 U1 12/1989
(Continued)

OTHER PUBLICATIONS

International Search Report for the corresponding international application No. PCT/EP2020/052899, dated Apr. 16. 2020, in the German language (2 pages).
(Continued)

*Primary Examiner* — Edward T Tolan
(74) *Attorney, Agent, or Firm* — Ronald S. Lombard (57) ABSTRACT

A forming tool and a forming method for producing an overpressure predetermined breaking point in a battery cover by deformation. The forming tool has a stamping tool and a die tool and an optional hold-down arrangement. On the die tool a support surface is provided for the battery cover to be deformed to form a forming cavity in the die tool in a depressed manner. On the stamping tool a stamp part and a ring-shaped stamp part is provided corresponding to a bead to be created in the battery cover in the cross-section. During deformation of the battery cover the stamping tool is pressed in the battery cover, whereby material of the battery cover flows into the forming cavity. Thereby the stamping tool is approached to the forming cavity in a manner such (Continued)

that the remaining distance corresponds to a minimum wall thickness at the overpressure predetermined breaking point.

7 Claims, 4 Drawing Sheets

(51) Int. Cl.
*H01M 50/148* (2021.01)
*H01M 50/342* (2021.01)

(58) Field of Classification Search
USPC .............................................. 72/389.1, 389.2
See application file for complete search history.

(56) References Cited

U.S. PATENT DOCUMENTS

| | | | |
|---|---|---|---|
| 7,493,790 B2* | 2/2009 | Heinicke | B21D 51/383 |
| | | | 72/379.4 |
| 7,650,773 B2* | 1/2010 | Shikano | B21D 53/78 |
| | | | 72/414 |
| 9,044,801 B2* | 6/2015 | Golovashchenko | B21D 22/22 |
| 9,895,736 B2* | 2/2018 | Terazawa | B21D 22/28 |
| 2016/0296990 A1 | 10/2016 | Muramoto | |
| 2018/0001368 A1* | 1/2018 | Otsuka | B21D 22/22 |
| 2018/0200773 A1* | 7/2018 | Nishijima | B21J 5/02 |

FOREIGN PATENT DOCUMENTS

| | | |
|---|---|---|
| DE | 10 2004 037 843 A1 | 2/2006 |
| DE | 698 29 711 T2 | 3/2006 |
| DE | 10 2010 044 788 A1 | 3/2012 |
| DE | 10 2013 220 957 A1 | 4/2015 |
| EP | 1 108 269 B1 | 10/2003 |
| JP | 2004111155 A | 4/2004 |
| WO | WO 2014/040676 A1 | 3/2014 |

OTHER PUBLICATIONS

English translation of the International Search Report for the corresponding international application No. PCT/ EP2020/052899 (2 pages).

Written Opinion of the International Searching Authority for the corresponding international application No. PCT/EP2020/052899, in the German language (5 pages).

English translation of the International Searching Authority for the corresponding international application No. PCT/EP2020/052899, (6 pages).

German Official Action for corresponding German patent application No. 10 2019 103 606.2 for which the present application claims priority, in the German language, (7 pages).

Google English translation of the German Official Action for corresponding German patent application No. 10 2019 103 606.2 for which the present application claims priority, (8 pages).

* cited by examiner

FORMING TOOL AND FORMING METHOD FOR PRODUCING AN OVERPRESSURE PREDETERMINED BREAKING POINT IN A BATTERY COVER

CROSS-REFERENCE TO RELATED APPLICATION

This is a continuation-in-part application of pending international patent application PCT/EP2020/052899 filed Feb. 5, 2020 and claiming the priority of German Patent Application No. 10 2019 103 606.2 filed Feb. 13, 2019. The said international patent application PCT/EP2020/052899 and said German Patent Application No. 10 2019 103 606.2 are both incorporated herein by reference in their entireties as though fully set forth.

BACKGROUND OF THE INVENTION

The invention refers to a forming tool as well as a forming method for producing an overpressure predetermined breaking point in a battery cover for a battery cell housing.

EP 1 108 269 B1 discloses a battery cell housing having a battery cell body and a battery cover. In a bottom of the battery cell body a groove-shaped predetermined breaking point can be provided at which the bottom rips in case of an overpressure in the battery cell housing. The groove-shaped overpressure predetermined breaking point is arc-shaped and does not extend in a completely closed manner in circumferential direction, whereby a kind of hinge is formed at which the bottom section that opens in case of overpressure and that is limited by means of the groove-shaped overpressure predetermined breaking point remains connected.

Further battery cell housings are, for example, known from WO 2014/040676 A1 and DE 698 29 711 T2. These further battery cell housings comprise a groove with a V-shaped cross-section that is closed in a ring-shaped manner.

DE 10 2013 220 957 A1 describes a battery and a method for securing the battery. The battery has a battery housing that may comprise an overpressure valve, a pressure relief element and a temperature control device, such as a cooling device.

The company BS & B GmbH offers reverse acting rupture discs that trigger in case a defined pressure threshold occurs for achieving pressure reduction (article "Controlled Pressure Relief" (original title: "Kontrollierte Druckentlastung"), Industrieanzeiger 25.18, pages 52 and 53 as well as www.bsbsystems.de/Berstscheiben/explosionsschutz berstscheiben.html).

DE 22 30 333 C3 describes a metal can for liquids or gases that are under pressure having a bottom that is bulged inwardly. In this bottom a ring-shaped perforation is inserted that extends around the axis of the metal can in which individual scorings are arranged along the circular path with distance to one another.

Starting from the prior art it is an object of the present invention to make the creation of an overpressure predetermined breaking point in a battery cover for a battery cell housing efficiently.

SUMMARY OF THE INVENTION

This object is solved by means of a forming tool and a forming method having the features of the claims. The invention refers to a forming tool 11 and a forming method for producing an overpressure predetermined breaking point 14 in a battery cover 10, wherein the overpressure predetermined breaking point 14 is particularly exclusively created by means of deformation. The forming tool 11 has a stamping tool 23 and a die tool 24 and as an option, a hold-down arrangement 25. On the die tool 24 a support surface 37 is provided for the battery cover 10 to be deformed relative to which a forming cavity 38 is formed in the die tool 24 in a depressed manner. On the stamping tool 23 a stamp part 32 and according to the example, a ring-shaped stamp part is provided that corresponds to a bead 15 to be created in the battery cover 10 in the cross-section. During deformation of the battery cover 10 the stamping tool 23 is pressed in the battery cover 10, whereby material of the battery cover 10 flows into the forming cavity 38. Thereby the stamping tool 23 is approached to the forming cavity 38 in a manner such that the remaining distance corresponds to a minimum wall thickness w at the overpressure predetermined breaking point 14.

The inventive forming tool is configured for creation of an overpressure predetermined breaking point in a battery cover for a battery cell housing. It comprises a die tool as well as a stamping tool that cooperate in order to create the overpressure predetermined breaking point in the battery cover by means of deformation.

The die tool has a support surface and a forming cavity provided in the support surface. The support surface is configured for placing the battery cover to be deformed thereon. The forming cavity extends completely or partly around an axis A. Preferably the forming cavity is completely closed in a circumferential direction around the axis A and thus configured in a ring-shaped manner. The forming cavity has a cavity bottom. In an axial direction with view parallel to the axis the distance between the support surface and the cavity bottom defines a first depth.

On an inner side a cavity inner flank adjoins the cavity bottom and a cavity outer flank adjoins the cavity bottom on an opposite outer side. The cavity inner flank is arranged closer to the axis than the cavity outer flank. Preferably the forming cavity has a groove-shaped form. It is open at the side opposite the cavity bottom. The forming cavity can have a U-shaped cross-section, wherein the cavity inner flank and the cavity outer flank may extend parallel to one another. Alternatively, it is also possible that the distance orthogonal to the axial direction between the cavity inner flank and the cavity outer flank increases with increasing distance from the cavity bottom. The width of the forming cavity can thus increase in axial direction away from the cavity bottom.

The stamping tool has a stamp part on its side facing the die tool. The stamp part is preferably completely continuously ring-shaped, if the forming depression is also completely continuously ring-shaped. Otherwise the stamp part can also extend partly around the axis A analog to the forming cavity. The stamp part extends in axial direction originating from a stamp base area up to a free end. The free end is facing the die tool. The distance between the free end of the stamp part and the stamp base area in axial direction defines a second depth. The second depth is larger than the first depth. With view in axial direction the stamp part is positioned above the cavity bottom. For example, the cavity inner flank and the cavity outer flank can define a hollow cylindrical space around the axis A, wherein the stamp part is located inside this hollow cylindrical space. The outer peripheral surface of this hollow cylindrical space thereby intersects the cavity outer flank and the inner peripheral surface of this hollow cylindrical space intersects thereby the cavity inner flank. The two peripheral surfaces are orientated parallel to one another.

The cross-section of the stamp part defines the cross-section shape of a bead of the overpressure predetermined breaking point to be formed in the battery cover.

During deformation of the battery cover between the stamping tool and the die tool the forming tool allows material flow into the forming cavity, the volume of which corresponds at least to the volume of the bead to be formed. Preferably the volume of the forming cavity is larger than the volume of the formed bead. Below the bead a wall thickness of the battery cover remains at which the battery cover can break or rip in case a pressure threshold is reached. Due to the defined material flow during deformation of the battery cover into the forming cavity, a hardening of the material can be controlled or can be determined. The material hardening during deformation influences the pressure threshold in addition to the remaining wall thickness of the battery cover at the overpressure predetermined breaking point at which the battery cover rips or breaks. The inventive forming tool allows a repeatable exact deformation of the battery cover in order to obtain an overpressure predetermined breaking point in the battery cover that triggers at a defined pressure threshold.

In an embodiment the shortest distance between the cavity inner flank and the cavity outer flank orthogonal to the axial direction defines a first width. The preferably larger volume of the forming cavity compared with the volume of the formed bead can be achieved by a respective large first width.

It is advantageous, if the stamp part comprises a ring part inner surface extending between the free end and the stamp base area as well as a ring part outer surface extending between the free end and the stamp base area. The ring part inner surface and the ring part outer surface are arranged with distance to each other orthogonal to the axial direction. The distance, particularly the maximum distance, between the ring part inner surface and the ring part outer surface can define a second width.

The ring part inner surface and the ring part outer surface can be orientated relative to one another in a parallel or inclined manner. Originating from the free end the width of the stamp part can increase with increasing axial distance. Thus, the stamp part can comprise an increasing width originating from the free end in direction toward the stamp base area.

Preferably the first width is larger than the second width and particularly at least about the factor 2 or 3 or 4 or 5 larger than the second width.

In a preferred embodiment the forming tool comprises a hold-down arrangement having at least one hold-down part in addition to the die tool and the stamping tool. The at least one hold-down part of the hold-down arrangement is located opposite the die tool and arranged adjacent to the stamping tool. In an embodiment an inner hold-down part and an outer hold-down part can be provided, wherein the stamping tool is arranged between the inner hold-down part and the outer hold-down part orthogonal to the axial direction. Thus, the inner hold-down part can extend into the ring-shape stamping tool. The outer hold-down part can surround the stamping tool in a ring-shaped manner. The at least one hold-down part can be spring elastically supported on the stamping tool such that the at least one hold-down part can be moved by means of the drive of the stamping tool. As an alternative, at least one of the provided hold-down parts, e.g. the inner hold-down part, can be immovably arranged relative to the stamping tool and can, for example, also be integrally configured with the stamping tool. It is also possible to move the at least one hold-down part by means of an additional drive in axial direction.

Particularly by means of the forming tool described above, a forming method can be carried out for producing the overpressure predetermined breaking point in the battery cover. For this the battery cover is first placed on the support surface of the die tool and thus between the die tool and the stamping tool. Subsequently, the die tool and/or the stamping tool is or are moved in axial direction toward each other, wherein the stamping tool is pressed into the battery cover. In doing so, material flows into the forming cavity of the die tool and a bead is created in the battery cover that is open to the top. Below the bead a section of the battery cover remains having a wall thickness that is less than at other locations of the battery cover and thus forms the overpressure predetermined breaking point.

In the forming method prior to or concurrently with the pressing of the stamping tool in the battery cover a clamping force between a hold-down arrangement and the support surface of the die tool can be created. In doing so, an unintentional and undesired deformation of the battery cover during forming of the bead can be avoided and the material flow from the area of the battery cover in which the bead is formed into the forming cavity is supported.

In a preferred embodiment of the forming tool the cavity bottom is substantially planar and can particularly extend in a plane that is orientated orthogonal to the axial direction. Alternatively to this, the cavity bottom of the forming cavity can also have one or more elevations, particularly ring-shaped elevations. The ring-shaped elevations can extend in circumferential direction around the axis.

In a preferred embodiment after forming of the bead in addition at least one notch can be formed in the battery cover inside the bead. The remaining wall thickness in the area of the bead bottom of the bead can be controlled directly adjoining or directly below the notch. Due to introducing at least one notch after forming the bead, the remaining wall thickness of the battery cover adjoining the notch can be adjusted very precisely. In doing so, the pressure at which the cover breaks or bursts can be defined very precisely, preferably with a tolerance of at most 1-2 bar.

The notch tapers in a preferred embodiment originating from the bead into the battery cover. In the cross-section the notch can have a V-shaped or triangular form.

The at least one notch is not completely closed in the direction in which the bead extends in the battery cover in a top view on the top side of the battery cover. Preferably the at least one notch extends only along a section of the bead. If multiple notches are provided, they are arranged with distance to one another. It is, for example, possible to provide a notch at least in one section of the bead where the bead extends in a curved manner with view from the top onto the top side of the battery cover. It is also possible to provide a notch in all regions in which the bead extends in a curved manner with view from the top on the top side of the battery cover. One common notch can also be assigned to multiple sections of the bead that extend in a curved manner.

The notch is preferably arranged at a location inside the bead at which the bead bottom transitions into a bead flank by means of a radius or a curvature. Particularly the notch is provided in the transition area between the bead bottom and the bead flank that is arranged closer to the axis and thus at the inner side in the bead so-to-speak. The notch can also be provided in the transition area between the bead bottom and the bead flank that is arranged further away from the axis and thus on the outer side in the bead so-to-speak.

BRIEF DESCRIPTION OF THE DRAWINGS

Preferred embodiments of the invention are derived from the dependent claims, the description as well as the drawings. In the following, embodiments of the invention are explained in detail based on the attached drawings. The drawings show:

DETAILED DESCRIPTION OF THE INVENTION

Figure 1:
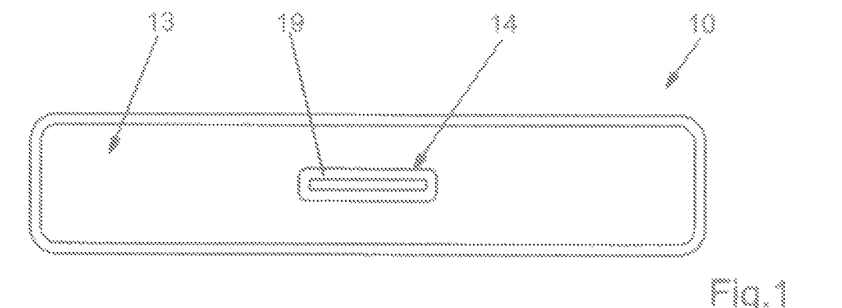
FIG. 1 a schematic top view on a bottom side of an embodiment of a battery cover, FIG. 2 a schematic top view on a top side opposite the bottom side of the battery cover of FIG. 1, FIG. 3 a perspective sectional illustration of a part of the battery cover of FIGS. 1 and 2 according to the section line III-III in FIG. 2, FIG. 4 a detailed illustration of the area IV of the battery cover in FIG. 3 in a cross-section, FIG. 5 a schematic top view on an embodiment of a stamping tool as well as an embodiment of a hold-down arrangement in an axial direction, FIG. 6 a schematic sectional illustration of a part of the stamping tool as well as the hold-down arrangement of FIG. 4 along a plane parallel to the axial direction according to the section line V-V in FIG. 4, as well as a schematic sectional illustration of a die tool of the forming tool, FIG. 7 the forming tool according to the embodiments of FIGS. 4 and 5 in a perspective sectional illustration in part, FIG. 8 a schematic sectional illustration of a battery cover provided with a bead as well as a notching tool for forming a notch in the bead of the battery cover, FIG. 9 a schematic illustration in part of the battery cover in the area IX in FIG. 8 having a notch provided in the bead in a sectional view, FIG. 10 a schematic top view on the bead in an embodiment of the battery cover in which two notches have been formed in the area of the bead, FIG. 11 a schematic side view of an embodiment of a notching tool and, FIG. 12 a perspective sectional illustration through the notching tool of FIG. 11 according to the section line XII-XII.
Figure 2:
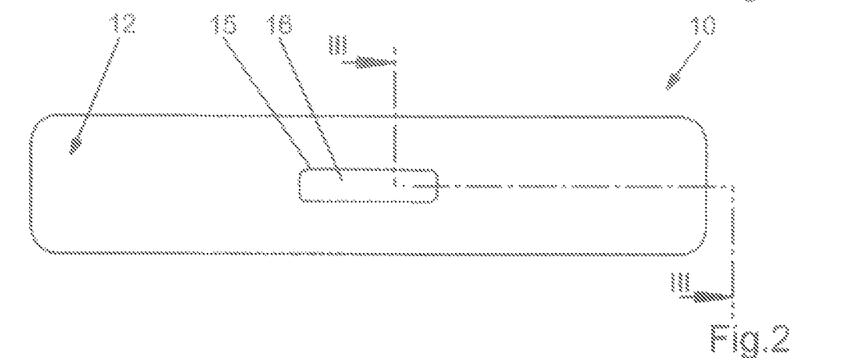
Figure 3:
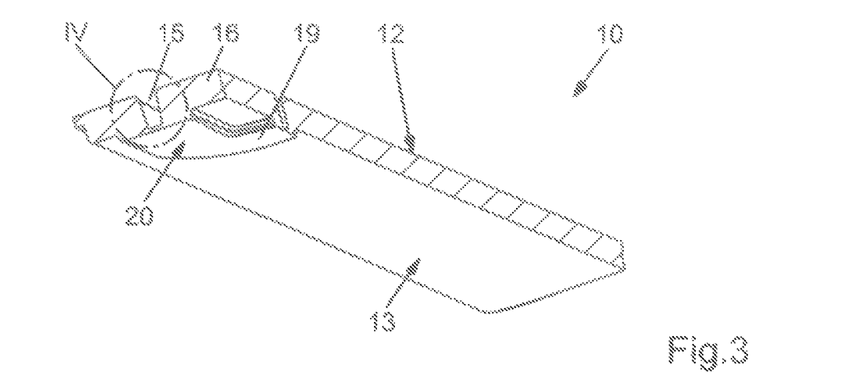

An embodiment of a battery cover 10 is illustrated in FIGS. 1-3. The battery cover 10 serves to close an opening of a battery cell housing, a prismatic battery cell housing according to the example. In the illustrated embodiment the battery cover 10 has a substantially rectangular contour, wherein the corner regions are rounded by means of a radius. In the use position of the battery cell housing the battery cover 10 can be arranged in an arbitrary position and orientation. It can close an opening in the battery cell housing that is arranged on top, at the bottom or on the side.

Figure 4:
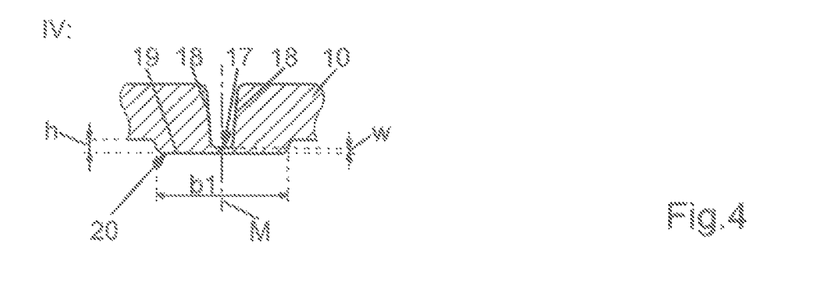

The battery cover 10 according to FIGS. 1-4 was formed by means of a forming tool 11 (FIGS. 5 and 6) by means of a forming method. The battery cover 10 has a top side 12 (FIG. 2) and a bottom side 13 (FIG. 1) opposite the top side 12. By means of the forming tool 11 or the forming method according to the present invention, at one location an overpressure predetermined breaking point 14 is created in the battery cover 10 by means of deformation. At the overpressure predetermined breaking point 14 the battery cover 10 comprises a minimum wall thickness w that is lower than the other wall thickness. For this a groove-like bead 15 that is open to the top side 12 of the battery cover 10 is introduced in the battery cover 10 by means of a forming method. In the embodiment the bead 15 is arranged in the center of the top side 12 of the battery cover 10, but could alternatively also be located at an arbitrary other location. The bead 15 extends preferably continuously completely like a ring and surrounds a central section 16. The bead 15 has a bead bottom 17 and two bead flanks 18 opposed to one another. In the embodiment the bead flanks 18 are not arranged parallel to each other, but are inclined relative to a center plane M that extends in the middle through the cross-section of the bead, preferably about approximately 3° (FIG. 4). In doing so, the bead 15 widens toward the top side 12. Orthogonal to the central plane M the bead 15 has a width that is least at the bead bottom 17. The width at the bead bottom 17 has an amount of approximately 1 mm.

The minimum wall thickness w of the battery cover 10 below the bead bottom 17 is less than 0.5 mm according to the example and can have a minimum wall thickness w of approximately 0.2 mm.

The battery cover 10 has a bulge 19 at the bottom side 13. The bulge 19 has an extension in circumferential direction around the axis A corresponding to the bead 15 and is, according to the example, continuously ring-shaped. Orthogonal to the central plane M the bulge 19 has a width that is larger than the width of the bead 15 and according to the example about the factor 3 or 4 or 5 larger than the width of the bead 15 at the bead bottom 17. In the embodiment the bulge 19 has a width of approximately 5 mm. It is configured symmetrically with regard to the central plane M. With view parallel to the central plane M and orthogonal to the bottom side 13 the bulge 19 has a height h compared with the adjacent region of the bottom side 13 that is larger than the minimum wall thickness w of the battery cover 10, such that the bead 15 extends in the bulge 19 in the range of the bead bottom 17. The height of the bulge 19 can be at least twice as large as the minimum wall thickness w of the battery cover according to the example and has an amount of 0.5 mm in the embodiment. Outside of the bulge 19 the wall thickness of the battery cover, i.e. the shortest distance between the top side 12 and the bottom side 13, has an amount of approximately 2 mm. The bulge has a surface section 20 that extends offset about the height h parallel to the remaining portion of the bottom side 13 of the battery cover 10.

Figure 5:
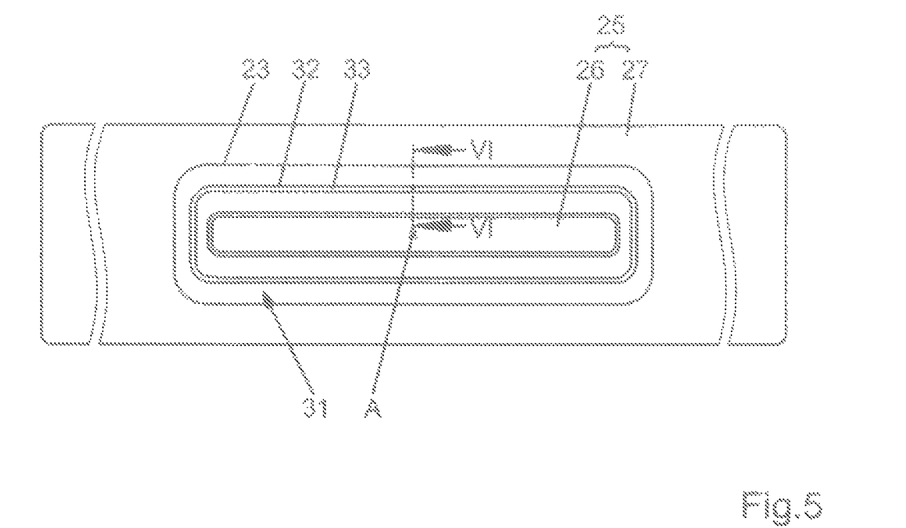
Figure 6:
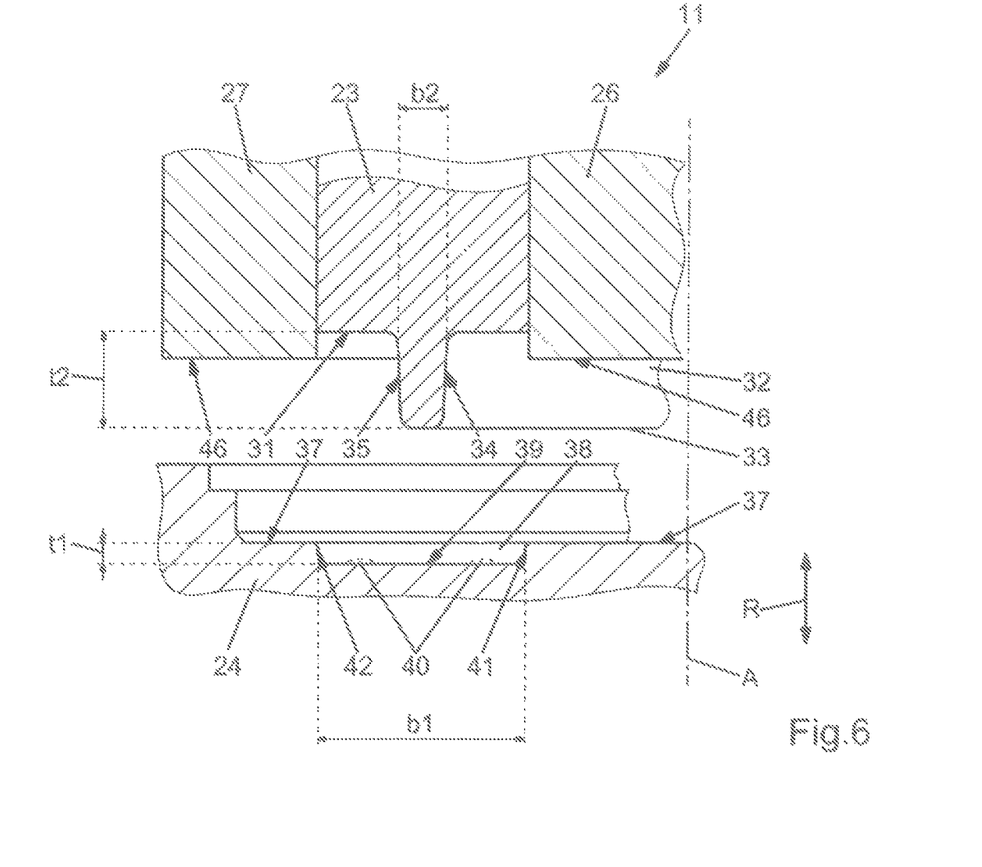
Figure 7:
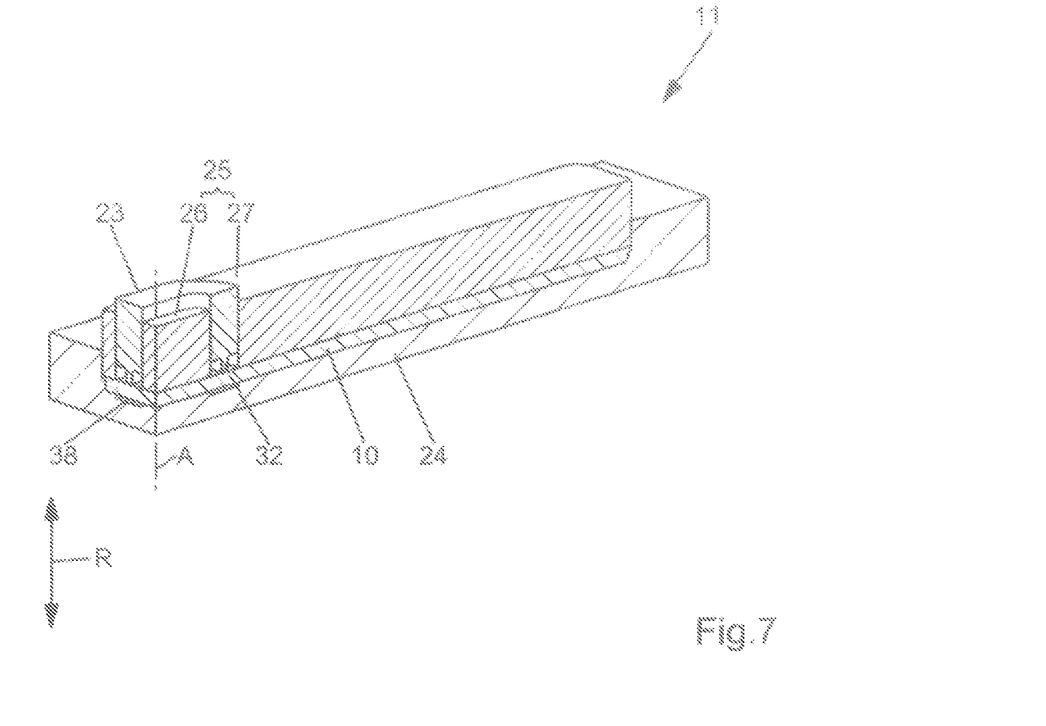

The forming tool 11 or parts thereof are illustrated in FIGS. 5-7 by means of which the battery cover can be deformed that was explained above in order to create the overpressure predetermined breaking point 14. For this the forming tool 11 has a stamping tool 23, a die tool 24 and according to the embodiment, a hold-down arrangement 25 having an inner hold-down part 26 and an outer hold-down part 27. The battery cover 10 can be inserted between the stamping tool 23 and the die tool 24, as schematically illustrated in FIG. 7. By means of cooperation of the stamping tool 23 and the die tool 24, the battery cover 10 can be deformed in order to create the overpressure predetermined breaking point 14.

According to the example, no chip-creating or material-removing machining of the battery cover 10 is carried out during the formation of the overpressure predetermined breaking point 14. The overpressure predetermined breaking point 14 is exclusively created by deformation.

The stamping tool 23 has a stamp base area 31 at its side facing the die tool 24 that is arranged in a plane orthogonal to an axis A in the embodiment. The direction parallel to the axis A is denoted as axial direction R. During deformation the stamping tool 23 and the die tool 24 are moved in axial direction R toward each other in order to form a battery cover 10 arranged there between. For example, the forming tool 11 can be used in a press as a press tool. For example, the die tool 24 can be arranged immovably relative to a press frame of the press, while the stamping tool 23 and the hold-down arrangement 25 are movable relative to the die tool 24 in axial direction R, for which the press comprises at least one and according to the example, exactly one drive. According to the example, the inner hold-down part 26 and the outer hold-down part 27 are movably arranged on the stamping tool 23 in axial direction R and can be supported via a spring device, not illustrated, on the stamping tool 23 respectively. The spring device defines the hold-down force that the inner hold-down part 26 and the outer hold-down part 27 apply on the battery cover 10 during deformation by means of the stamping tool 23.

In the embodiment the stamping tool 23 is configured in a continuously ring-shaped manner and surrounds the axis A. The axis A extends through the geometric center point of the stamping tool 23.

A stamp part 32 extends away from the stamp base area 31 in axial direction R toward a free end 33. In the embodiment the stamp part 32 is configured as completely continuously extending ring around the axis A. In an alternative not illustrated embodiment the stamp part 32 could also comprise one or more stamp part sections extending in a circumferential angular range around the axis A. In such a configuration of the stamp part 32 a bead 15 can be formed in the battery cover 10, for example, that does not extend completely continuously around the central section 16, but comprises one or more discontinuities in which the wall thickness of the battery cover is larger than the minimum wall thickness w.

The die tool 24 has a support surface 37 for placing on the battery cover 10 to be deformed. The support surface 37 extends at least in sections orthogonal to the axial direction R. The shape of the support surface 37 depends from the cross-section shape of the battery cover 10 to be manufactured. In the embodiment the support surface 37 has at least one section that is orientated orthogonal to the axial direction R in which a forming cavity 38 is provided. The forming cavity 38 is configured in a groove-like manner and has an extension in circumferential direction around the axis A that corresponds to the extension of the stamp part 32 in circumferential direction around the axis A. In the embodiment the forming cavity 38 extends continuously ring-shaped around the axis A.

The extension of the forming cavity 38 as well as the stamp part 32 can be straight in sections and/or curved in sections. In the embodiment of the forming tool 11 illustrated here the extension around the axis A is rectangular with rounded corner regions, as it is by way of example illustrated in FIG. 5 for the stamp part 32.

The forming cavity 38 is open toward the stamping tool 23 and has a cavity bottom 39 arranged opposite the stamp part 32 in axial direction R. According to the example, the cavity bottom 39 is planar and extends in a plane orthogonal to the axial direction R. In modification thereto the cavity bottom 39 could also comprise one or more elevations and/or depressions. Two elevations 40 are schematically illustrated in FIG. 6 in dashed lines that show an alternative extension of the cavity bottom 39.

A cavity inner flank 41 adjoins the cavity bottom 39 orthogonal to the axial direction R on one side and a cavity outer flank 42 adjoins the cavity bottom 39 on the opposite side. The cavity inner flank 41 and the cavity outer flank 42 connect the cavity bottom 39 with the respective adjacent edge of the support surface 37. Orthogonal to the axial direction R the shortest distance between the cavity inner flank 41 and the cavity outer flank 42 defines a first width b1. In axial direction R the distance and particularly the maximum distance between the support surface 37 and the cavity bottom 39 defines a first depth t1.

The distance between the stamp base area 31 and the free end 33 of the stamp part 32 in axial direction R defines a second depth t2. The second depth t2 is larger than the first depth t1. In the embodiment, the second depth t2 is at least three times or at least four times larger than the first depth t1. According to the example, the second depth t2 has an amount of approximately 2.3 mm and the first depth t1 has an amount of approximately 0.5 mm, for example.

The stamp part 32 has a ring part inner surface 34 surrounding the axis A in circumferential direction, as well as a ring part outer surface 35 surrounding the axis A in circumferential direction. The ring part inner surface 34 and the ring part outer surface 35 are arranged with distance to each other orthogonal to the axial direction R and connect the stamp base area 31 with the free end 33 of the stamp part 32 in each case. The distance between the ring part inner surface 34 and the ring part outer surface 35 and according to the example the maximum distance define a second width b2. The second width b2 is less than the first width b1. According to the example, the first width b1 is at least three times or at least four times or at least five times larger than the second width b2. In an embodiment the first width b1 has an amount of approximately 5 mm and the second width b2 has an amount of 1 mm to 1.2 mm.

The hold-down arrangement 25 is configured to create a clamping force prior to and/or during deformation of the battery cover 10 that clamps the battery cover 10 between the hold-down arrangement 25 and the die tool 24. For this the hold-down arrangement 25 can be driven independently from the stamping tool 23. The inner hold-down part 26 is surrounded by the ring-shaped stamping tool 23 in a circumferential direction around the axis A. The outer hold-down part 27 in turn surrounds the ring-shaped stamping tool 23 in circumferential direction completely around the axis A. One fourth of the forming tool 11 is illustrated perspectively in FIG. 7. The connecting edge between the two sectional planes extends along the axis A in FIG. 7.

The clamping surface 46 of the hold-down arrangement 25 facing the die tool 24 that is in sections provided at the inner hold-down part 26 and at the outer hold-down part 27 extends in the embodiment in a plane that is orientated orthogonal to the axial direction R. The configuration of the clamping surface 46 is adapted to the shape of the top side 12 of the battery cover 10 to be deformed and can also have a different shape.

By means of the forming tool 11the battery cover 10 is deformed by means of a forming method that runs as follows:

First, the battery cover 10 to be deformed is arranged on the die tool 24. The bottom side 13 of the battery cover 10 thereby lies on the support surface 37 of the die tool 24. The forming cavity 38 is completely or at least substantially left empty. In its non-deformed condition the battery cover 10 does not extend into the forming cavity 38 of the die tool 24 according to the example.

By means of the hold-down arrangement 25 the battery cover 10 to be deformed is subsequently clamped between the clamping surface 46 and the die tool 24 and subject to a defined clamping force during the forming process. In doing so, the material flow during deformation is defined and undesired deformations of the battery cover 10 are avoided. For deforming the battery cover 10 the stamp part 32 of the stamping tool is pressed against the top side 12 and pressed into the battery cover 10 such that a bead 15 is created in the battery cover 10 by deformation corresponding to the shape of the stamp part 32. The material of the battery cover 10 that is pushed away thereby flows in the forming cavity 38 of the die tool. Thus, the bead 15 is formed and the bulge 19 at the bottom side 13 of the battery cover 10 is formed by means of the forming method. The shape of the bulge 19 corresponds to the shape of the forming cavity 38 in the die tool 24.

During the deformation of the battery cover 10 the stamping tool 23 is moved toward the die tool 24 only as far so that a distance remains between the free end 33 and the forming cavity 38 that corresponds to the minimum wall thickness w of the battery cover adjoining the bead bottom 17. In doing so, the overpressure predetermined breaking point 14 is formed in the battery cover 10.

After introducing the bead 15 in the battery cover 10, at least one notch 50 can be formed in the area of the bead 15 in the battery cover 10 in a further method step. The at least one notch 50 can be formed by means of a notching tool 51. The notching tool 51 has a tool part 52 for each notch 50 to be formed respectively. In the cross-section the tool part 52 tapers to its free end, e.g., V-shaped, triangular-shaped, wedge-shaped or the like. The flanks of this tool part 52 can extend straight or curved with view on the cross-section.

For forming the at least one notch 50, the notching tool 51 is introduced in the bead 15 from the open side and is pressed against the battery cover 10 in a transition area between the bead bottom 17 and an adjacent bead flank 18, such that material is pushed away and the at least one notch 50 is created. Thereby the material can be pushed away in the bead 15 adjacent to the at least one notch 50. During forming of the at least one notch 50 the battery cover 10 is preferably placed on a support 53, such that the bottom side 13 of the battery cover 10 remains undeformed during forming of the at least one notch 50. The support 53 can thereby be adapted to the contour of the bottom side 13 of the battery cover 10 that has already been deformed before (FIG. 8).

Figure 8:
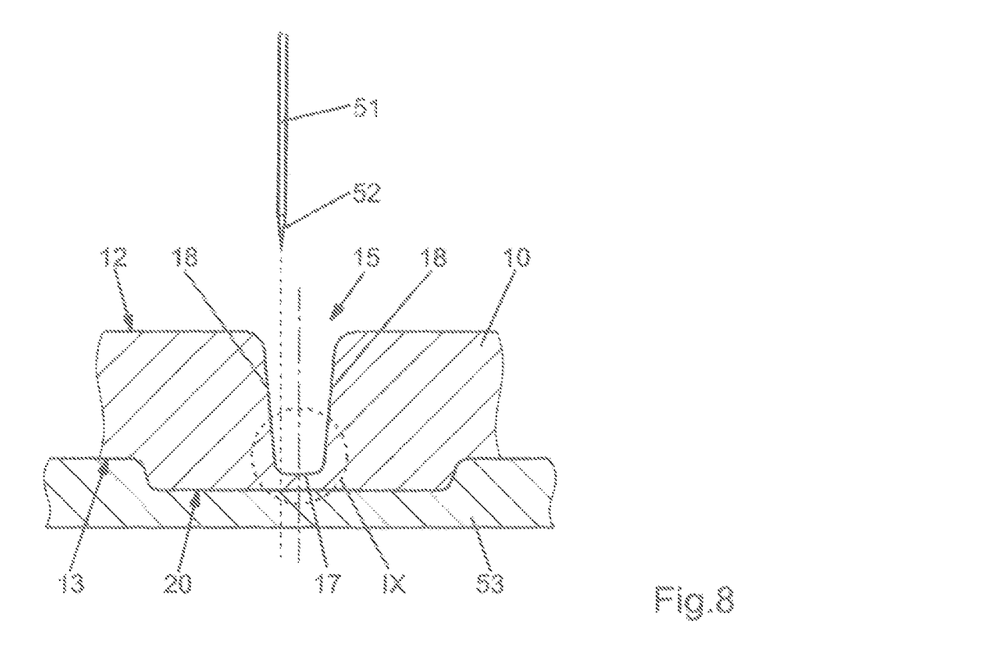
Figure 9:
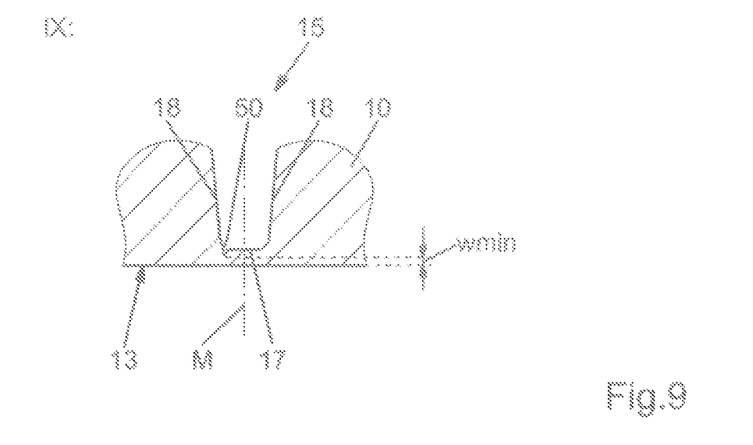

The at least one notch 50 inserted in the battery cover 10 inside the bead 15 by means of the notching tool 51 is highly schematically illustrated in the cross-section in FIG. 9, wherein FIG. 9 shows the area IX of FIG. 8 in an enlarged manner. The notch 50 is preferably arranged offset from the center plane M. The at least one notch 50 is particularly formed in a region of the bead 15 in the battery cover 10 in which the inner surface of the bead 15 is curved, e.g. in the transition region between the bead bottom 17 and an adjoining bead flank 18. There, high stresses occur in case of overpressure in the battery cell housing, such that bursting of the battery cover 10 can be very precisely adjusted in a defined manner to an overpressure limit value.

It is apparent from FIG. 9 that the remaining wall thickness directly below the notch 50 corresponds to a minimum wall thickness wmin. The minimum wall thickness wmin is the shortest distance between the bottom side 13 of the battery cover 10 and the at least one notch 50.

According to the shape of the at least one tool part 52 the notch 50 has, for example, a triangular or wedge-shaped form. It can taper originating from the inside of the bead 15 toward the bottom side 13 of the battery cover 10.

The minimum wall thickness wmin can preset the burst pressure for the battery cell housing very precisely. Compared with forming the bead 15, much less material of the battery cover 10 is pushed aside during forming of the at least one notch 50, particularly at most 10% or at most 5% or at most 2% of the material volume that is pushed aside during forming of the bead 15. Thereby elastic stresses or deformations in the notching tool 51 and the battery cover 10 are very low during forming of the at least one notch 50 and the predefined minimum wall thickness wmin can be very exactly achieved. In doing so, the predefined burst pressure of the battery cell housing or the battery cover 10 can be adjusted very precisely. On the contrary, the wall thickness w below the bead bottom 17 after the first method step (forming of the bead) can be subject to some deviations due to elasticities in the forming tool 11 as well as the battery cover 10, such that the burst pressure cannot be adjusted sufficiently precisely in case respectively small tolerance ranges for the burst pressure are required. Such a more precise adjustment can be achieved by the two-stage method in which first the bead 15 is formed and subsequently the at least one notch 50 is inserted inside the bead 15.

Figure 10:
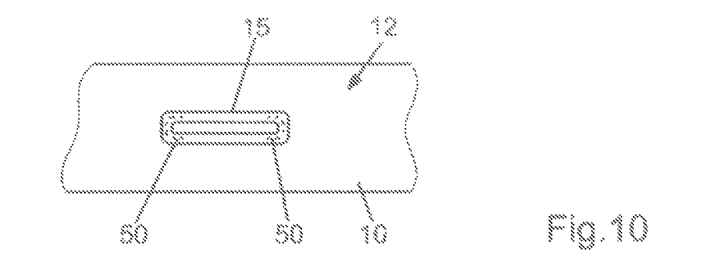

The at least one notch 50 is not completely continuously ring-shaped in circumferential direction or extension direction of the bead 15 with view on the top side 12 of the battery cover 10. On the contrary, in the embodiment the bead 15 is completely continuously ring-shaped or is configured continuously in a ring-like manner (FIGS. 2 and 10). FIG. 10 illustrates that in an embodiment, a notch 50 is provided at least in regions in which the bead 15 extends around the central section 16 in a curved manner with view from top on the top side 12 of the battery cover 10 (notches 50 are illustrated in dashed lines). Respectively one notch 50 can be assigned to a region of the bead 15 extending in such a curved manner. It is also possible to assign a common notch 50 to multiple of such sections of the bead 15 extending in a curved manner, as it is for example illustrated in FIG. 10. There only two notches 50 are provided that are respectively assigned to two curved sections of the bead 15.

Apparently in modification to the described and illustrated embodiment the number of notches 50 can also be higher or lower.

Figure 11:
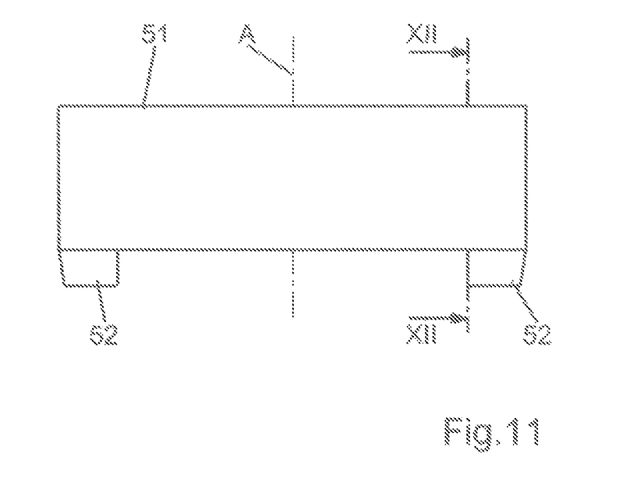
Figure 12:
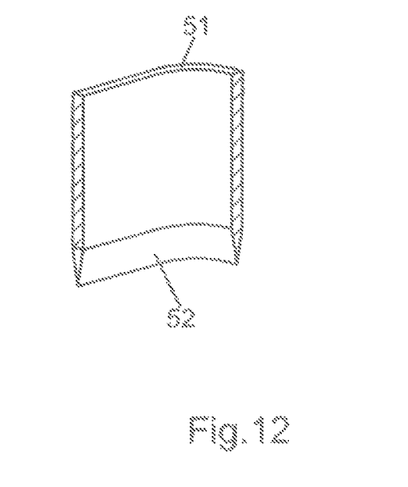

As schematically illustrated in FIG. 10, in the embodiment of the battery cover 10 illustrated here two U-shaped notches 50 are formed in the bead 15. Accordingly, a notching tool 51 can comprise two U-shaped tool parts 52, as schematically shown in FIGS. 11 and 12. The configuration of the tool parts 52 of the notching tool 51 depends on the number and the extension of the notches 50 to be formed and can also be configured in a different manner in other configurations.

The invention refers to a forming tool 11 and a forming method for producing an overpressure predetermined breaking point 14 in a battery cover 10, wherein the overpressure predetermined breaking point 14 is particularly exclusively created by means of deformation. The forming tool 11 has a stamping tool 23 and a die tool 24 and as an option, a hold-down arrangement 25. On the die tool 24 a support surface 37 is provided for the battery cover 10 to be deformed relative to which a forming cavity 38 is formed in the die tool 24 in a depressed manner. On the stamping tool 23 a stamp part 32 and according to the example, a ring-shaped stamp part is provided that corresponds to a bead 15 to be created in the battery cover 10 in the cross-section. During deformation of the battery cover 10 the stamping tool 23 is pressed in the battery cover 10, whereby material of the battery cover 10 flows into the forming cavity 38. Thereby the stamping tool 23 is approached to the forming cavity 38 in a manner such that the remaining distance corresponds to a minimum wall thickness w at the overpressure predetermined breaking point 14.

LIST OF REFERENCE SIGNS 10 battery cover
11 forming tool
12 top of battery cover
13 bottom of battery cover
14 overpressure predetermined breaking point
15 bead
16 central section
17 bead bottom
18 bead flank
19 bulge
20 area section of bulge
23 stamping tool
24 die tool
25 hold-down arrangement
26 inner hold-down part
27 outer hold-down part
31 stamp base area
32 stamp part
33 free end
34 ring part inner surface
35 ring part outer surface
37 support surface
38 forming cavity
39 cavity bottom
40 elevation
41 cavity inner flank
42 cavity outer flank
46 clamping surface
50 notch
51 notching tool
52 tool part
53 support
A axis
b1 first width
b2 second width
h bulge height
M center plane
R axial direction
t1 first depth
t2 second depth
w minimum wall thickness

What is claimed is:

1. A forming tool (11) for producing an overpressure predetermined breaking point (14) in a battery cover (10) for a battery cell housing, the forming tool (11) comprising:
a die tool (24) that comprises a forming cavity (38) in a support surface (37), wherein the forming cavity (38) is groove-shaped and extends partly or completely around an axis (A) and has a cavity bottom (39), wherein the distance between the support surface (37) and the cavity bottom (39) in an axial direction (R) parallel to the axis (A) defines a first depth (t1),
wherein a cavity inner flank (41) adjoins the cavity bottom (39) orthogonal to the axial direction (R) on an inner side of the forming cavity (38) and the cavity outer flank (42) adjoins the cavity bottom (39) on an outer side of the forming cavity (38) opposite the inner side, wherein a shortest distance between the cavity inner flank (41) and the cavity outer flank (42) orthogonal to the axial direction (R) defines a first width (b1), a stamping tool (23) that comprises a stamp part (32) on its side facing the die tool (24) that extends originating from a stamp base area (31) up to a free end (33), wherein the stamp part (32) extends partly or completely around the axis (A), wherein the stamp part (32) comprises a ring part inner surface (34) extending between the free end (33) and a stamp base area (31) and a ring part outer surface (35) extending between the free end (33) and the stamp base area (31), wherein the ring part inner surface (34) and the ring part outer surface (35) are arranged with distance to one another orthogonal to the axial direction (R), wherein this distance defines a second width (b2), wherein the first width (b1) is longer than the second width (b2), at least about the factor two, wherein the distance between the free end (33) of the stamp part (32) and the stamp base area (31) define a second depth (t2) that is larger than the first depth (t1), wherein the stamp part (32) is positioned above the cavity bottom (39) in axial direction (R) and corresponds in the cross-section to a bead (15) of the overpressure predetermined breaking point (14) to be formed in the battery cover (10),
a notching tool (51) is provided, which is configured to form at least one notch (50) inside of the bead (15).

2. The forming tool according to claim 1, characterized by a hold-down arrangement (25) is provided arranged opposite the die tool (24) and adjacent to the stamping tool (23).

3. The forming tool according to claim 2, characterized by the hold-down arrangement (25) comprises an inner hold-down part (26) extending along the axis (A) and into the ring-shaped stamping tool (23) and an outer hold-down part (27) surrounding the ring-shaped stamping tool (23).

4. A forming method for manufacturing an overpressure predetermined breaking point (14) in a battery cover (10) for a battery cell housing making use of the forming tool (11) according to claim 1, comprising the following steps:
Positioning of battery cover (10) to be deformed on the die tool (24) such that its bottom side (13) abuts on the support surface (37) of the die tool (24) and that the forming cavity (38) of the die tool (24) remains empty,
Pressing the stamp part (32) of the stamping tool (23) into the battery cover (10), whereby material of the battery cover (10) is pushed aside into the forming cavity (38) of the die tool (24) and a bead (15) is created that is open to a top side (12) of the battery cover (10), such that a wall thickness (w) of the battery cover (10) below the bead (15) is smaller than the wall thickness at other locations of the battery cover (10) and thus forms the overpressure predetermined breaking point (14),
Clamping the battery cover (10) prior or concurrently with the pressing of the stamping tool (23) into the battery cover (10) between a hold-down arrangement (25) and the support surface (37) of the die tool (24),
Forming the at least one notch (50) inside the bead (15) by means of a notching tool (51).

5. The forming method according to claim 4, characterized by the wall thickness of the battery cover (10) below the notch (50) has a minimum wall thickness (wmin).

6. The forming method according to claim 4, characterized by the at least one notch (50) extends in circumferential direction in a non-ring-shaped non-continuous manner.

7. The forming method according to claim 4, characterized by the notch (50) is formed in a transition region between a bead bottom (17) and a bead flank (18).

* * * * *